United States Patent
Kobayashi et al.

(10) Patent No.: US 7,903,373 B2
(45) Date of Patent: Mar. 8, 2011

(54) THIN FILM MAGNETIC HEAD HAVING HEATING ELEMENT

(75) Inventors: Kiyoshi Kobayashi, Niigata-ken (JP); Sumihito Morita, Niigata-ken (JP); Tomoo Otsuka, Niigata-ken (JP)

(73) Assignee: TDK Corporation, Tokyo (JP)

( * ) Notice: Subject to any disclaimer, the term of this patent is extended or adjusted under 35 U.S.C. 154(b) by 792 days.

(21) Appl. No.: 11/802,019

(22) Filed: May 18, 2007

(65) Prior Publication Data

US 2007/0274004 A1    Nov. 29, 2007

(30) Foreign Application Priority Data

May 19, 2006  (JP) .................................. 2006-139899
Dec. 15, 2006  (JP) .................................. 2006-337928

(51) Int. Cl.
*G11B 5/31* (2006.01)
*G11B 5/40* (2006.01)
(52) U.S. Cl. ................ 360/125.31; 360/125.32; 360/128
(58) Field of Classification Search .................. 360/128, 360/75, 125.3, 125.31, 125.32, 125.71, 125.74, 360/125.75
See application file for complete search history.

(56) References Cited

U.S. PATENT DOCUMENTS

| | | | | |
|---|---|---|---|---|
| 7,113,369 B2* | 9/2006 | Ota et al. | .................... | 360/234.5 |
| 7,155,808 B2* | 1/2007 | Sasaki et al. | ................ | 29/603.07 |
| 7,330,336 B2* | 2/2008 | Luo et al. | .................. | 360/125.31 |
| 7,372,665 B1* | 5/2008 | Stoev et al. | .............. | 360/125.33 |
| 7,403,354 B2* | 7/2008 | Pust et al. | ................ | 360/125.31 |
| 7,428,124 B1* | 9/2008 | Song et al. | .................... | 360/128 |
| 7,430,098 B1* | 9/2008 | Song et al. | ................ | 360/294.7 |
| 7,573,682 B2* | 8/2009 | Pust et al. | .................... | 360/294.7 |
| 7,583,479 B2* | 9/2009 | Umehara et al. | ............... | 360/320 |
| 7,586,710 B2* | 9/2009 | Partee et al. | .................... | 360/75 |
| 7,595,960 B2* | 9/2009 | Shimizu et al. | ............ | 360/234.5 |
| 7,612,965 B2* | 11/2009 | Kurihara et al. | ......... | 360/125.75 |
| 7,643,247 B2* | 1/2010 | Sano et al. | .................... | 360/128 |
| 7,649,713 B2* | 1/2010 | Ota et al. | ................. | 360/125.32 |

(Continued)

FOREIGN PATENT DOCUMENTS

JP    2005-011413    1/2005

(Continued)

OTHER PUBLICATIONS

English Translation of Japan Office Action of Patent Application No.: P2006-337928 dated May 13, 2008.

*Primary Examiner* — William J Klimowicz

(74) *Attorney, Agent, or Firm* — Hunton & Williams, LLP

(57) ABSTRACT

A thin film magnetic head is provided, in which the amount of protrusion in the periphery of an element portion can be reduced or a local temperature increase of electrode leads of a heating element can be prevented. The thin film magnetic head includes a playback element disposed between lower and upper shield layers, a recording element laminated on the upper shield layer, a heating element which is disposed below a coil layer and which generates heat to allow the playback element to protrude toward the recording medium side through thermal expansion, and a pair of electrode leads including overlapping regions, which are in contact with rear ends of the heating element and which overlap with the upper shield layer, and heat dissipation regions. Furthermore, connection wiring portions of the pair of electrode leads are disposed in a region sandwiched between the upper shield layer and a magnetic layer.

4 Claims, 6 Drawing Sheets

U.S. PATENT DOCUMENTS

| | | | |
|---|---|---|---|
| 7,656,619 B1* | 2/2010 | Yan et al. | 360/294.7 |
| 2004/0165311 A1* | 8/2004 | Yamanaka et al. | 360/128 |
| 2005/0024775 A1* | 2/2005 | Kurita et al. | 360/234.3 |
| 2005/0094316 A1* | 5/2005 | Shiramatsu et al. | 360/234.5 |
| 2006/0034014 A1* | 2/2006 | Kato et al. | 360/128 |
| 2006/0056110 A1* | 3/2006 | Kato et al. | 360/234.3 |
| 2007/0091512 A1* | 4/2007 | Nichols et al. | 360/324.2 |
| 2007/0127161 A1* | 6/2007 | Sano et al. | 360/313 |
| 2007/0211381 A1* | 9/2007 | Kobayashi et al. | 360/126 |
| 2007/0230056 A1* | 10/2007 | Beach et al. | 360/234.5 |
| 2007/0268624 A1* | 11/2007 | Luo et al. | 360/126 |
| 2008/0145709 A1* | 6/2008 | Yamashita et al. | 428/811 |
| 2008/0266722 A1* | 10/2008 | Kawasaki et al. | 360/319 |
| 2009/0103208 A1* | 4/2009 | Aoki et al. | 360/110 |

FOREIGN PATENT DOCUMENTS

JP    2005-056447    3/2005

* cited by examiner

THIN FILM MAGNETIC HEAD HAVING HEATING ELEMENT

This application claims the benefit of Japanese Patent Application No. 2006-139899, filed on May 19, 2006 and Japanese Patent Application No. 2006-337928, filed on Dec. 15, 2006, the contents of which are incorporated herein by reference.

BACKGROUND OF THE INVENTION

1. Field of the Invention

The present invention relates to a thin film magnetic head in which the amount of flying is controlled by locally protruding an element portion toward a recording medium side through thermal expansion.

2. Description of the Related Art

A thin film magnetic head is provided with at least one playback element, which includes a multilayer film exhibiting a magnetoresistance effect between a lower shield layer and an upper shield layer and which reads magnetic information from a recording medium on the basis of the change in resistance of the multilayer film. The thin film magnetic head also includes a recording element which includes a pair of magnetic core layers opposed to each other with a magnetic gap layer therebetween on a medium-facing surface and which gives a recording magnetic field leaking from the magnetic gap layer to the recording medium so as to record the magnetic information. In a so-called compound type thin film magnetic head provided with both the playback element and the recording element, the recording element is laminated on the playback element.

In the thin film magnetic head, it is desirable that the spacing between the element portion including at least one of the playback element and the recording element and the recording medium opposed to each other is controlled to become small in order to improve the head characteristics (playback characteristics, recording characteristics). Heretofore, various thin film magnetic heads have been proposed, in which element portions are allowed to protrude toward the recording medium side by on the order of a few nanometers through thermal expansion by using heating elements which generate heat during energization. The heating element is formed with a flat pattern parallel to film surfaces of individual layers constituting the thin film magnetic head, and is disposed between any two layers. Specifically, the heating element is disposed as a layer under a lower core layer, as a layer on an upper core layer, between the lower core layer and the upper core layer, in a surface protective layer, or the like. The thin film magnetic heads provided with the above-described heating elements are described in US 2004017638 A1, Japanese Unexamined Patent Application Publication No. 2005-11413, and the like.

However, when the element portion is intended to protrude toward the recording medium side, the periphery of the element portion is also thermally expanded and, therefore, it is difficult to control in such a way that the protrusion of the element portion becomes the largest. In the case where the amount of protrusion of the periphery of the element portion is larger than that of the element portion, the periphery of the element portion is brought into contact with the recording medium prior to the contact of the element portion, and, thereby, not only the recording and playback characteristics may deteriorate, but also the recording medium may be damaged. In order to reduce the amount of protrusion of the periphery of the element portion, a heat dissipation plate may be disposed for releasing the heat of the periphery of the element portion to the outside. However, it has not yet been realized because, for example, the process becomes complicated, or a layer for formation of the heat dissipation plate is restricted.

Furthermore, there is a problem in that a local temperature increase occurs in the electrode lead used for energizing the heating element. The electrode lead of the heating element is usually disposed in an alumina insulating layer, most of the electrode lead has a width larger than the line width of the heating element in order to reduce the electric resistance, and a narrow connection wiring portion connecting between the wide wiring portion and the rear end of the heating element in the height direction is included. Since the electric resistance of the connection wiring portion is larger than that of the wide wiring portion, when a current passes through the electrode lead, local heat generation occurs. A local temperature increase in the electrode lead may cause a break due to migration and, thereby, the reliability deteriorates.

SUMMARY OF THE INVENTION

It is an object of the present invention to provide a thin film magnetic head capable of reducing the amount of protrusion of the periphery of an element portion. It is also an object of the present invention to provide a thin film magnetic head capable of preventing a local temperature increase in the electrode lead of a heating element.

Exemplary embodiments of the present invention have been completed in consideration of the fact that when a two-dimensional size of a pair of electrode leads of the heating element is increased, the pair of electrode leads are allowed to function as a wiring pattern for energizing the heating element during a playback operation and function as heat dissipation plates for releasing the heat from a coil to the outside during a recording operation and, thereby, the amount of protrusion of the periphery of the element portion can be reduced.

A thin film magnetic head according to an exemplary embodiment of the present invention is provided with a playback element disposed between a lower shield layer and an upper shield layer, a recording element which is laminated on the upper shield layer and which includes a pair of magnetic layers and a coil layer for giving a magnetic field to the pair of magnetic layers, a heating element which is disposed below the coil layer and which generates heat during energization so as to allow at least one of the playback element and the recording element to protrude toward the recording medium side through thermal expansion, and a pair of electrode leads of the heating element. In such an embodiment, the pair of electrode leads include overlapping regions which are in contact with rear ends of the heating element in a height direction and which overlap with the upper shield layer in a lamination direction and heat dissipation regions extending from the overlapping regions in the height direction and a track width direction.

Also, the area of the heat dissipation regions is larger than the area of the overlapping regions. The area of the overlapping regions is larger than the area of a heating region of the heating element so as to facilitate reception of the heat from the shield layer.

The heating element and the pair of electrode leads may be disposed while being embedded in an insulating layer disposed at a position just below the coil layer. A higher heat dissipation effect can be exerted as the position of disposition of the heat dissipation region approaches the coil layer. The pair of electrode leads may be formed from the same material as the material for the heating element are disposed integrally with the heating element. When the heating element and the pair of electrode leads are formed simultaneously, that is, in the same step, the manufacturing process is carried out easily.

Exemplary embodiments of the present invention have been completed in consideration of the fact that in a region sandwiched between an upper shield layer formed from a metal material and a magnetic layer of the recording element in the lamination direction, since the thermal conductivities of the upper shield layer and the magnetic layer are higher than the thermal conductivity of an insulating layer (alumina) disposed in the periphery of the element, even when the heat is generated from a connection wiring portion of the electrode lead, the heat is diffused through the upper shield layer and the magnetic layer and, thereby, a local temperature increase of the electrode lead can be reduced.

A thin film magnetic head according to an exemplary embodiment of the present invention is provided with a playback element disposed between a lower shield layer and an upper shield layer, a recording element laminated on the upper shield layer, a heating element which is disposed below a coil layer serving as a part of the recording element and which generates heat during energization so as to allow at least one of the playback element and the recording element to protrude toward the recording medium side through thermal expansion, and a pair of electrode leads of the heating element. In such an embodiment, the pair of electrode leads include wide wiring portions having a width larger than the line width of the heating element and connection wiring portions for connecting between the wide wiring portions and the rear ends of the heating element in a height direction, and the connection wiring portions are disposed in a region sandwiched between the upper shield layer and a magnetic layer of the recording element in a lamination direction. The magnetic layer of the recording element is a lower core layer or an upper core layer in a longitudinal recording system and is a return yoke layer in a perpendicular recording system.

The connection wiring portions may be disposed taking a two-dimensionally trapezoidal shape in which the line width is decreased from the wide wiring portions toward the rear ends of the heating element in the height direction.

The heating element and the pair of electrode leads may be embedded in an insulating layer disposed at a position just below the coil layer.

The pair of electrode leads may be formed from the same material as the material for the heating element are disposed integrally with the heating element. When the heating element and the pair of electrode leads are formed simultaneously, that is, in the same step, the manufacturing process is carried out easily.

According to an exemplary embodiment of the present invention, since the pair of electrode leads of the heating element include the overlapping regions, which overlap with the upper shield layer in a lamination direction, and heat dissipation regions, which are extended from the overlapping regions in the height direction and a track width direction, the heat dissipation region of each electrode lead functions as a heat dissipation plate during recording. Consequently, the amount of protrusion of the periphery of the element portion is reduced.

According to an exemplary embodiment of the present invention, even when the heat is generated from connection wiring portions of the electrode leads during energization of the heating element, the heat is diffused through the upper shield layer and the magnetic layer of the recording element. Consequently, a local temperature increase in the electrode leads can be prevented.

DESCRIPTION OF THE PREFERRED EMBODIMENTS

The present invention will be described below with reference to the drawings. In each drawing, the X direction is defined as a track width direction, the Y direction is defined as a height direction, and the Z direction is defined as a lamination direction of individual layers constituting a thin film magnetic head and a movement direction of a recording medium.

Figure 1:
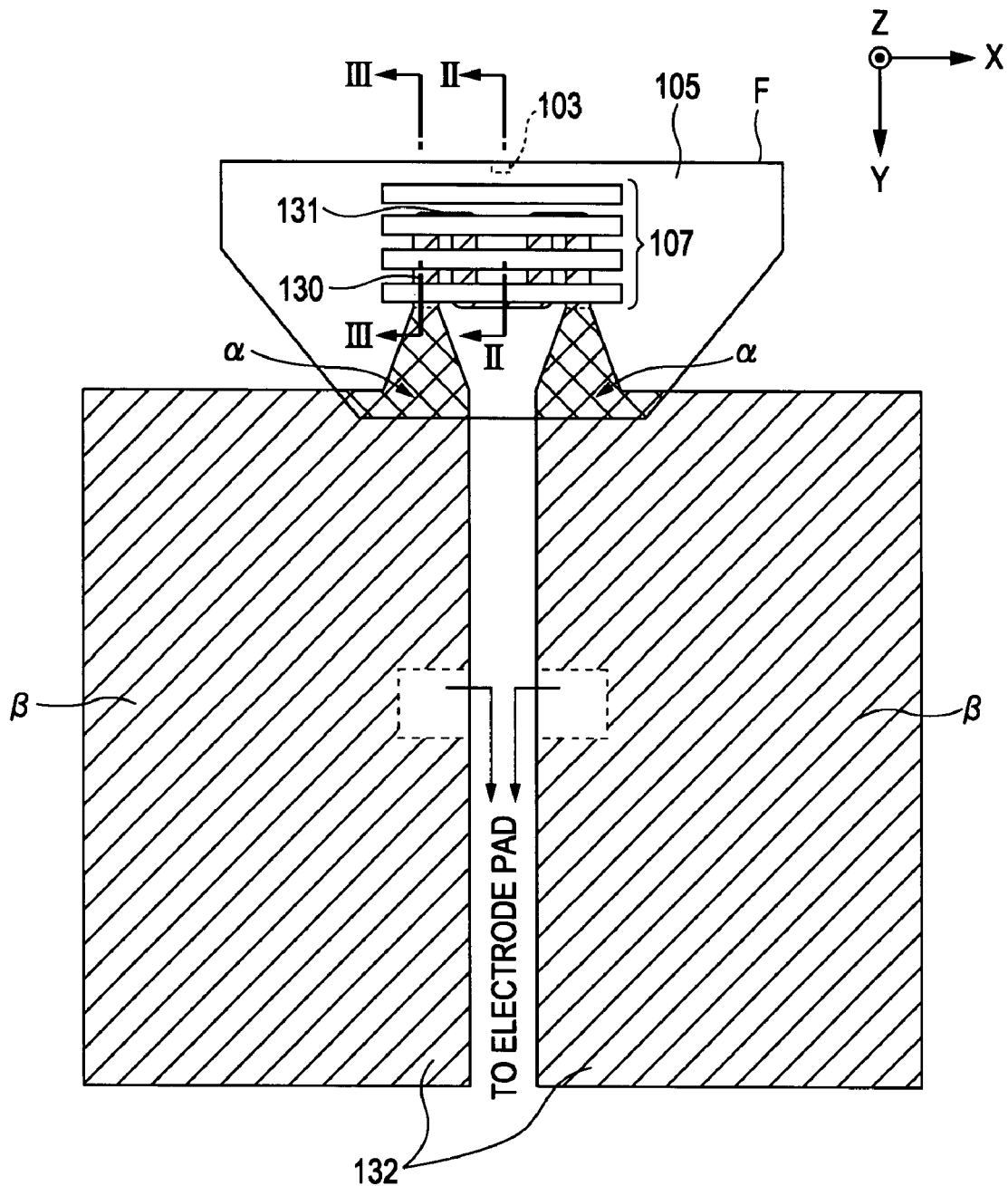
FIG. 1 is a plan view showing a thin film magnetic head according to a first embodiment of the present invention, viewed from above in a lamination direction, and is a diagram for explaining a pair of electrode leads of a heating element.
Figure 2:
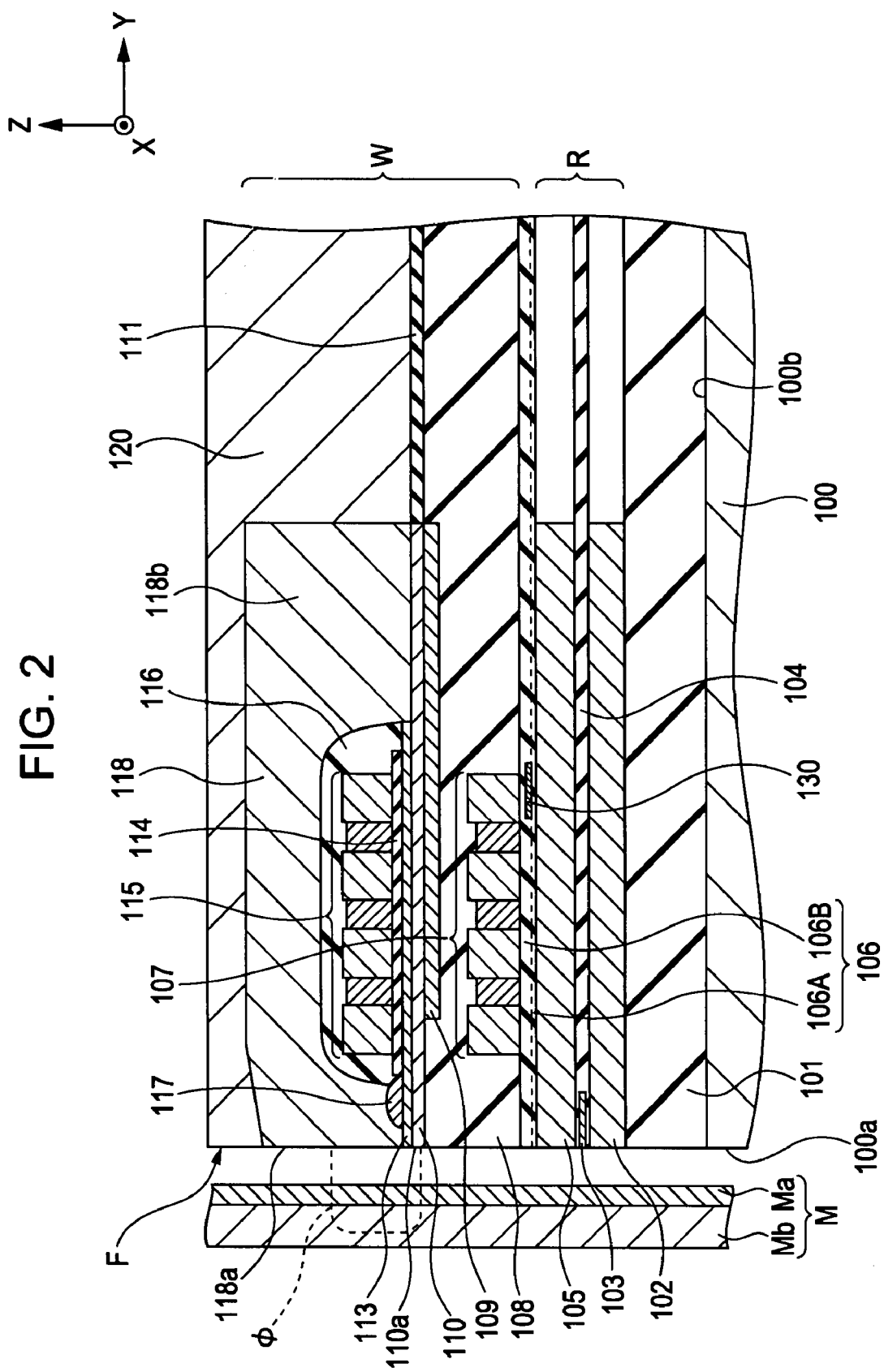
FIG. 2 is a sectional view of a section taken along a line II-II shown in FIG. 1.
Figure 3:
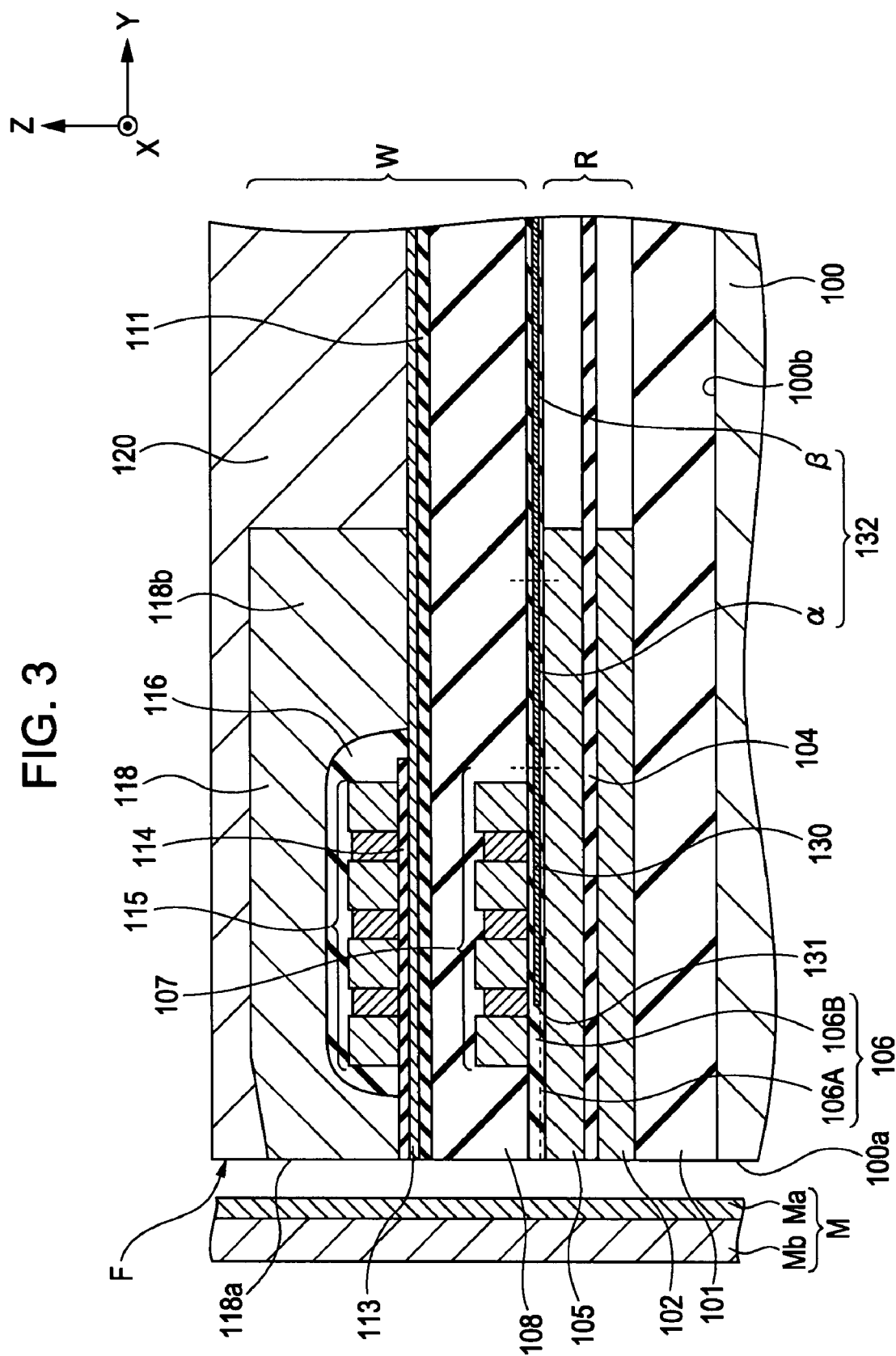
FIG. 3 is a sectional view of a section taken along a line III-III shown in FIG. 1.

FIG. 1 to FIG. 3 show a thin film magnetic head according to the first embodiment of the present invention. FIG. 1 is a plan view showing the structure of the thin film magnetic head, viewed from above lower layer coils 107. FIG. 2 is a sectional view of a section taken along a line II-II shown in FIG. 1. FIG. 3 is a sectional view of a section taken along a line III-III shown in FIG. 1.

The thin film magnetic head is a perpendicular magnetic recording head including a playback portion R and a recording portion W, each produced by laminating thin films, on a trailing-side end surface 100$b$ of a slider 100. The playback portion R reads magnetic information from a recording medium M through the use of a magnetoresistance effect. The recording portion W gives a perpendicular magnetic field Φ to the recording medium M and, thereby, magnetize a hard film Ma of the recording medium M in a perpendicular direction so as to perform a recording operation.

The recording medium M includes the hard film Ma having high residual magnetization on the medium surface side and a soft film Mb having a high magnetic transmittance on the side inner than is the hard film Ma. This recording medium M is in the shape of a disk, for example, and is rotated about the center of the disk serving as the center of the rotation axis. The slider 100 is formed from a nonmagnetic material, e.g., $Al_2O_3 \cdot TiC$. A medium-facing surface 100$a$ of the slider 100 faces the recording medium M, and when the recording medium M is rotated, the slider 100 flies from surface of the recording medium M by an air stream on the surface.

A protective layer 101 formed from a nonmagnetic insulating material, e.g., $Al_2O_3$ or $SiO_2$, is disposed on the trailing-side end surface 100$b$ of the slider 100, and the playback portion R is disposed on this protective layer 101. The playback portion R includes a lower shield layer 102, an upper shield layer 105, a gap insulating layer 104 for filling between the lower shield layer 102 and the upper shield layer 105, and a playback element 103 positioned in this gap insulating layer 104. The playback element 103 is a magnetoresistance effect element, e.g., AMR, GMR, or TMR.

The recording portion W is laminated on the upper shield layer 105. The recording portion W includes a plurality of lower layer coils 107 disposed on the upper shield layer 105 with a coil insulating layer 106 therebetween, a main magnetic pole layer (magnetic core layer) 110, a magnetic gap layer 113, a plurality of upper layer coils 115 disposed on the magnetic gap layer 113 with a coil insulating layer 114 therebetween, and a return yoke layer (magnetic core layer) 118.

The lower layer coils 107 are formed from, for example, at least one nonmagnetic metal material selected from Au, Ag, Pt, Cu, Cr, Al, Ti, NiP, Mo, Pd, Rh, and Ni. Alternatively, the lower layer coils 107 may have a laminated structure in which these nonmagnetic metal materials are laminated. A lower layer coil insulating layer 108 is disposed around the lower layer coils 107.

A heating element 130, which is positioned under the lower layer coils 107 and which generates heat through energization, is embedded in the lower layer coil insulating layer 108. The heating element 130 is composed of a heating element pattern in the shape of an inverted letter Ω extending from both sides of the playback element 103 in a track width direction toward the rear in a height direction or in a meandering shape, and is formed from, for example, NiFe, CuNi, or CuMn by a sputtering method. This heating element 130 has edge portions 131 parallel to the lower layer coils 107 (FIG. 1, FIG. 3) on the medium-facing surface side, and is arranged in such a way that the edge portions 131 are positioned in the spaces between the lower layer coils 107. The heating element 130 is energized through a pair of electrode leads 132 extending toward the rear in the height direction. The playback element 103 is thermally expanded due to energization of the heating element 130 and is protruded toward the recording medium M side. The amount of protrusion of the playback element 103 can be controlled by the heat generation temperature of the heating element 130, that is, by the amount and the time of current passed through the heating element 130. The coil insulating layer 106 is composed of a first insulating layer 106A interposing between the upper shield layer 105 and the heating element 130 and a second insulating layer 106B disposed on this first insulating layer 106A while covering the heating element 130.

The main magnetic pole layer 110 and an auxiliary yoke layer 109 magnetically connected to the main magnetic pole layer 110 are disposed on the lower layer coil insulating layer 108. The auxiliary yoke layer 109 formed from a magnetic material having a saturation magnetic flux density lower than that of the main magnetic pole layer 110 is disposed just below the main magnetic pole layer 110, and magnetically functions as a part of the main magnetic pole layer 110. The top surfaces of the auxiliary yoke layer 109 and the lower layer coil insulating layer 108 are flattened. A plating substrate layer is disposed on this flattened surface, and the main magnetic pole layer 110 is further disposed on this plating substrate layer. The main magnetic pole layer 110 has a predetermined length from the surface F facing the recording medium M (hereafter simply referred to as a facing surface F) in the Y direction shown in the drawing. The dimension in the X direction shown in the drawing of a front end surface 110a exposed at the facing surface F is specified to be the recording track width Tw. This main magnetic pole layer 110 is formed by plating from a ferromagnetic material, e.g., Ni—Fe, Co—Fe, or Ni—Fe—Co, having a high saturation magnetic flux density.

The magnetic gap layer 113 is disposed on the main magnetic pole layer 110 and an insulating material layer 111 filling the surroundings thereof (both sides in the X direction shown in the drawing and the rear in the Y direction shown in the drawing of the main magnetic pole layer 110). A throat height-determining layer 117 formed from an inorganic or organic material is disposed on the magnetic gap layer 113, at a position a predetermined distance from the facing surface F. The throat height of the thin film magnetic head H is specified by the distance from the facing surface F to the front end edge of the throat height-determining layer 117.

Similarly to the lower layer coils 107, the upper layer coils 115 are formed from, for example, at least one nonmagnetic metal material selected from Au, Ag, Pt, Cu, Cr, Al, Ti, NiP, Mo, Pd, Rh, and Ni. Alternatively, the upper layer coils 115 may have a laminated structure in which these nonmagnetic metal materials are laminated. An upper layer coil insulating layer 116 is disposed around the upper layer coils 115.

The respective end portions of the above-described lower layer coil 107 and the upper layer coil 115 in the X direction shown in the drawing are electrically connected to each other so as to become into the shape of a solenoid. The shape of the coil layer is not specifically limited to the shape of a solenoid, but may be a spiral shape in which the coil is wound around a connection portion 118b between the main magnetic pole layer 110 and the return yoke layer 118.

The return yoke layer 118 formed from a ferromagnetic material, e.g., permalloy, is disposed over the upper layer coil insulating layer 116 to the magnetic gap layer 113. This return yoke layer 118 has a front end surface 118a exposed at the facing surface F and is opposed to the main magnetic pole layer 110 with a gap spacing therebetween on the facing surface F. The rear end of the return yoke layer 118 in the height direction is the connection portion 118b connected to the main magnetic pole layer 110. The return yoke layer 118 is covered with a surface protective layer 120.

In the thin film magnetic head having the above-described entire configuration, the pair of electrode leads 132 of the heating element 130 include overlapping regions α which are in contact with rear ends of the heating element 130 in the height direction and which overlap with the upper shield layer 105 in a lamination direction (in a vertical direction shown in FIG. 3) and heat dissipation regions β extending from the overlapping regions α in the height direction and the track direction. The overlapping regions α are formed to have an area larger than the heating area of the heating element 130. The heat dissipation regions β are regions which function as heat dissipation plates during the recording operation of the thin film magnetic head, and the two-dimensional size thereof is larger than the area of the overlapping regions α. It is preferable that the area of the heat dissipation regions β is increased because a higher heat dissipation effect is exerted. In practice, the area 1.1 times or more of the area of the overlapping regions α is favorable. The pair of electrode leads 132 of the present embodiment formed from the same material as that for the heating element 130 are disposed integrally with the heating element 130. However, the electrode leads may be formed from an electrically conductive material different from the material for the heating element 130, for example, from an electrically conductive material having the thermal conductivity higher than that of the heating element 130.

The above-described pair of electrode leads 132 are a wiring pattern for electrically connecting the heating element 130 to electrode pads (not shown in the drawings) for connection to external circuits. In the playback operation of the thin film magnetic head H, the heating element 130 is energized through the pair of electrode leads 132 and, thereby, the heating element 130 generates heat. The heat generated from the heating element 130 is transferred from the heating element 130 toward the facing surface F side, and the surroundings of the playback element 103 are heated from both sides in the track width direction and the rear end side in the height direction. Consequently, the surroundings of the playback element 103 are thermally expanded, and the playback element 103 is allowed to locally protrude toward the recording medium M side. When the playback element 103 is allowed to locally protrude toward the recording medium M side, as described above, since the facing distance between the playback element 103 and the recording medium M is decreased, the playback output is increased, and the playback performance is improved.

On the other hand, in the recording operation of the thin film magnetic head H, the heating element is not energized, but the lower layer coils 107 and the upper layer coils 115 are energized, so that a perpendicular magnetic field Φ induced by the lower layer coils 107 and the upper layer coils 115 is given to the recording medium M. The lower layer coils 107 and the upper layer coils 115 generate heat by the energization, and the heat from the lower layer coils 107 and the upper layer coils 115 is transferred to the upper shield layer 105 positioned just below the lower layer coils 107. However, the heat of the upper shield layer 105 is transferred to the heating element 130, the overlapping regions α of the pair of electrode leads 132, and the heat dissipation regions β, and is released to the outside from the heat dissipation regions β. As described above, the heat dissipation regions β are extended from the upper shield layer 105 in the height direction and the track width direction and, therefore, the heat of the upper shield layer 105 is easily released to the outside of the element. Consequently, the heat dissipation effect becomes higher as the two-dimensional sizes of the heat dissipation regions β are increased. In this manner, the amount of protrusion of the periphery portion of the element due to thermal expansion is reduced.

The above-described heating element 130 and the pair of electrode leads 132 may be produced by the following process. A metal film composed of an electrically conductive material, e.g., NiFe, CuNi, or CuMn, is formed all over the first insulating layer 106A on the upper shield layer 105. The metal film may be formed by a sputtering method, for example. The metal film is patterned into a predetermined heating element shape and predetermined electrode lead shapes. The heating element shape and the electrode lead shape may be set at will, and at this time, the two-dimensional shapes (areas) of the overlapping regions and the heat dissipation regions of the electrode leads are set simultaneously. It is preferable that the area of the heat dissipation regions of the electrode leads is larger than the area of the overlapping regions, and the area of the overlapping regions is larger than the area of the heating region of the heating element. By this patterning, the heating element 130 and the pair of electrode leads 132 are produced on the first insulating layer 106A. After the patterning, the second insulating layer 106B is formed on the first insulating layer 106A including the heating element 130 and the pair of electrode leads 132 and, thereby, the heating element 130 and the pair of electrode leads 132 are embedded in the coil insulating layer 106 composed of the first insulating layer 106A and the second insulating layer 106B. In this manner, the heating element 130 and the pair of electrode leads 132 shown in FIG. 1 to FIG. 3 are produced. When the heating element 130 and the pair of electrode leads 132 are formed integrally, as in the present embodiment, the manufacturing process is carried out easily. However, the heating element 130 and the pair of electrode leads 132 may be formed from different electrically conductive materials through different steps, as a matter of course. In the case where the heating element 130 and the pair of electrode leads 132 are formed from different electrically conductive materials, it is preferable that the pair of electrode leads 132 are formed by using an electrically conductive material having the thermal conductivity higher than the thermal conductivity of an electrically conductive material for forming the heating element 130.

As described above, in the first embodiment, since the pair of electrode leads 132 including overlapping regions α, which overlap with the upper shield layer 105 in the lamination direction, and the heat dissipation regions β extending from the overlapping regions in the track width direction and the height direction are disposed, the pair of electrode leads 132 function as a wiring pattern for energizing the heating element during playback and function as heat dissipation plates for releasing the heat from the lower layer coils 107 during recording. Therefore, the amount of protrusion of the periphery of the element portion is reduced during both the playback and the recording, and the element portion (playback portion R) can be locally protruded toward the recording medium M side. Consequently, the playback performance and the recording performance are improved, and at the same time, portions other than the element portion (playback portion R, recording portion W) do not become into contact with the recording medium M, so that the recording medium M is not damaged.

Figure 4:
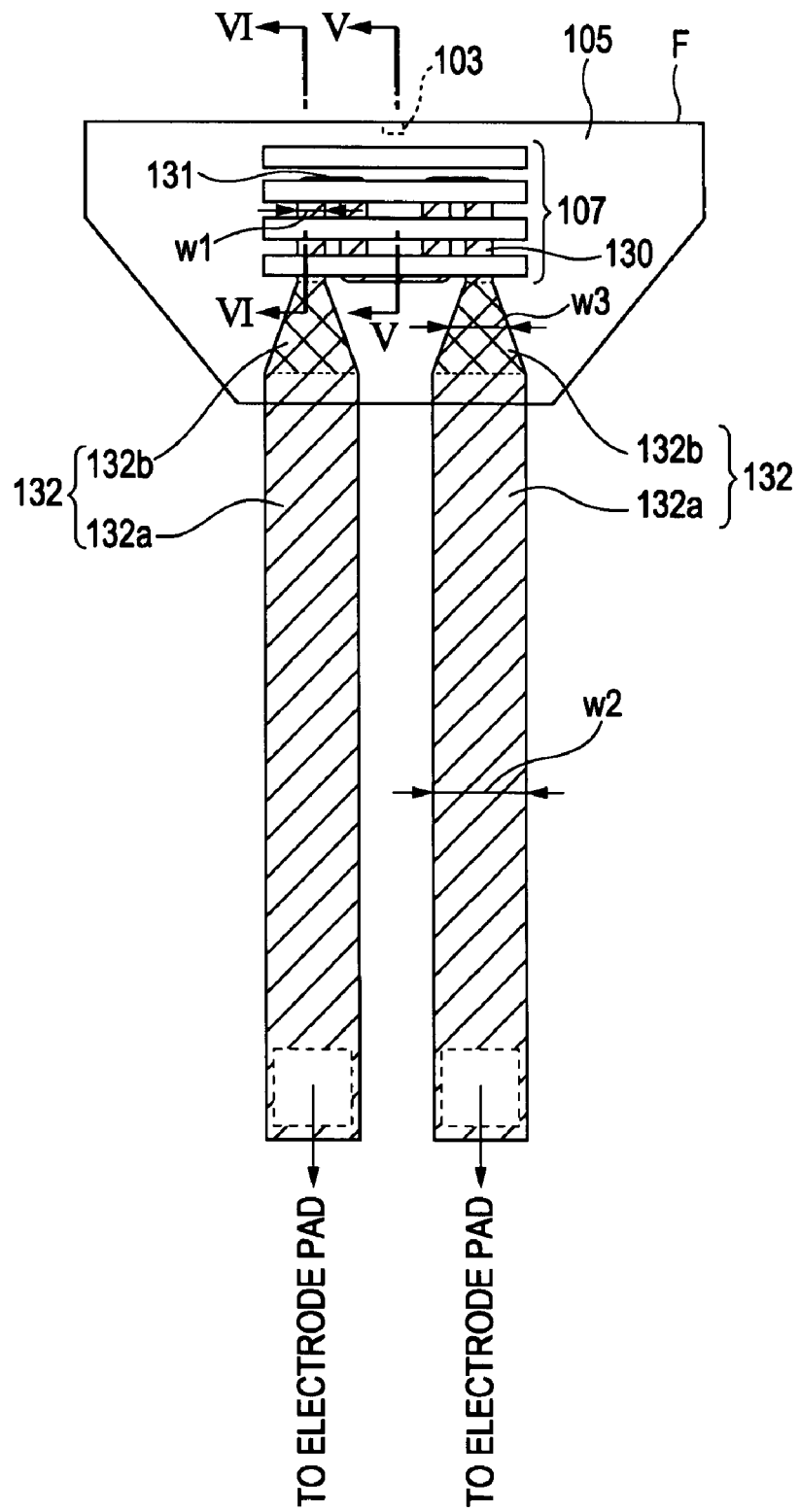
FIG. 4 is a plan view showing a thin film magnetic head according to a second embodiment of the present invention, viewed from above in a lamination direction, and is a diagram for explaining a pair of electrode leads of a heating element.
Figure 5:
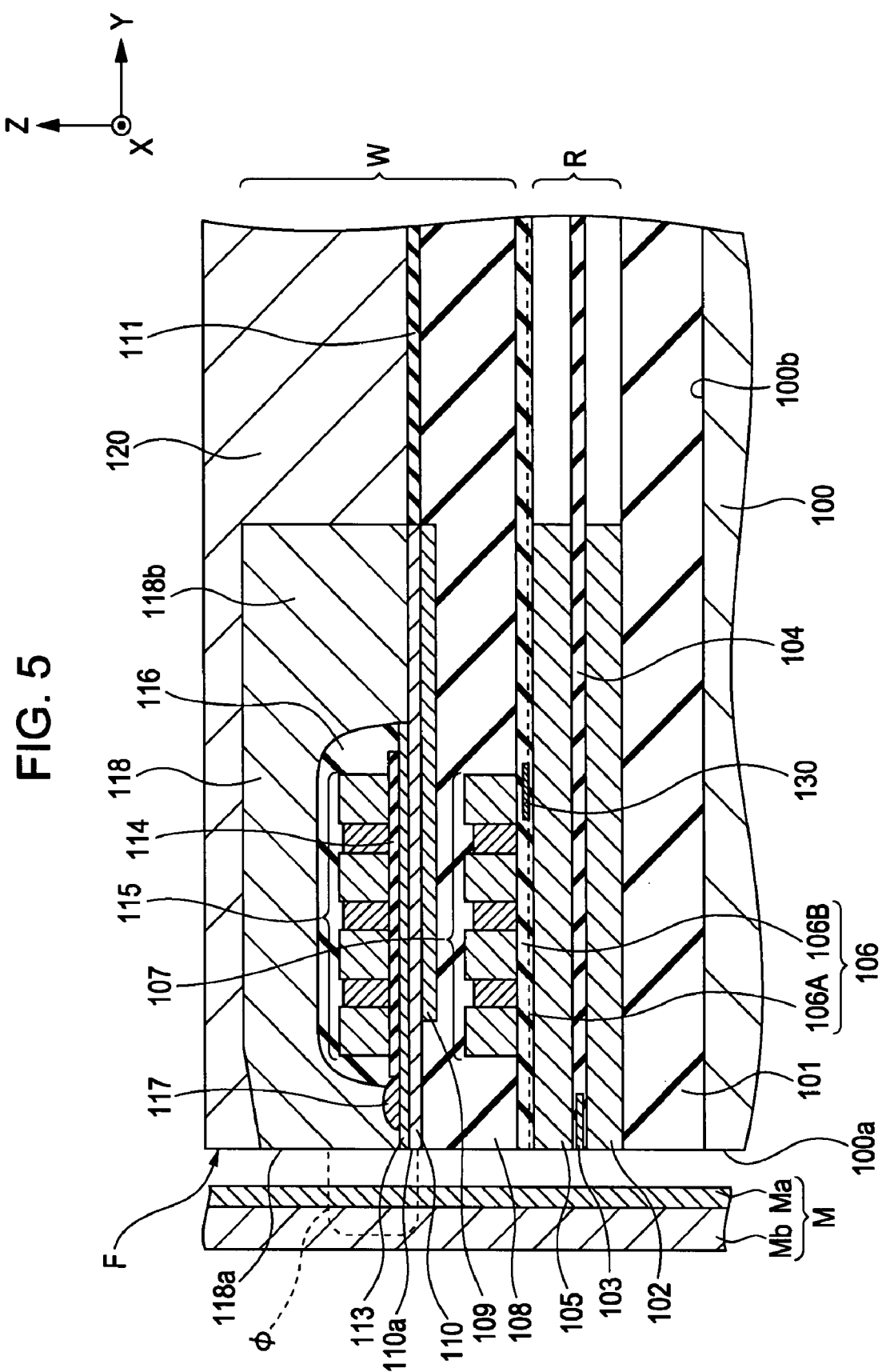
FIG. 5 is a sectional view of a section taken along a line V-V shown in FIG. 4.
Figure 6:
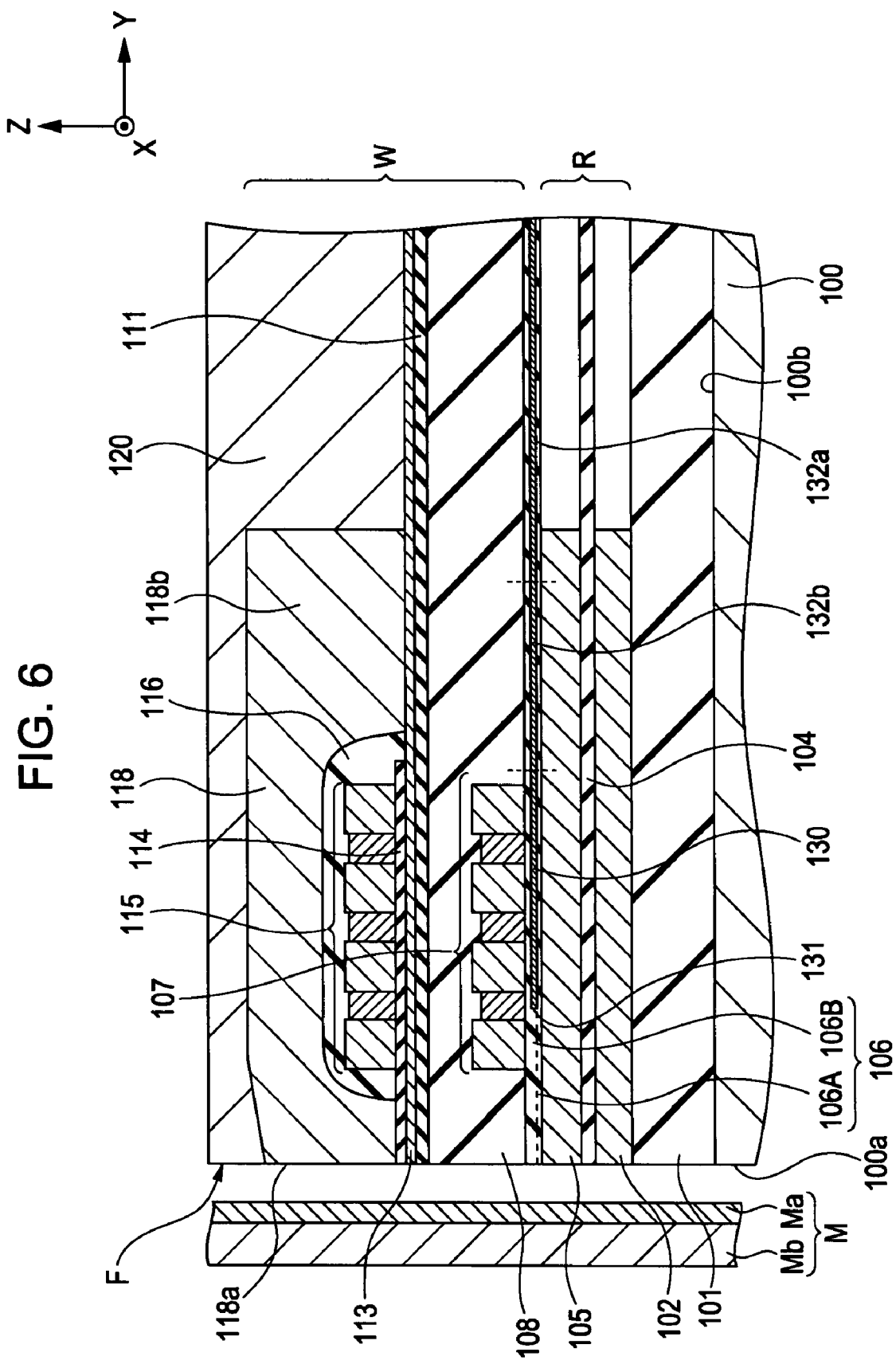
FIG. 6 is a sectional view of a section taken along a line VI-VI shown in FIG. 4.

FIG. 4 to FIG. 6 show a thin film magnetic head according to the second embodiment of the present invention. FIG. 4 is a plan view showing the structure of the thin film magnetic head, viewed from above lower layer coils 107. FIG. 5 is a sectional view of a section taken along a line V-V shown in FIG. 4. FIG. 6 is a sectional view of a section taken along a line VI-VI shown in FIG. 4.

The thin film magnetic head is a perpendicular magnetic recording head including a playback portion R and a recording portion W, each produced by laminating thin films, on a trailing-side end surface 100b of a slider 100. The playback portion R reads magnetic information from a recording medium M through the use of a magnetoresistance effect. The recording portion W gives a perpendicular magnetic field Φ to the recording medium M and, thereby, magnetize a hard film Ma of the recording medium M in a perpendicular direction so as to perform a recording operation.

The recording medium M includes the hard film Ma having high residual magnetization on the medium surface side and a soft film Mb having a high magnetic transmittance on the side inner than is the hard film Ma. This recording medium M is in the shape of a disk, for example, and is rotated about the center of the disk serving as the center of the rotation axis. The slider 100 is formed from a nonmagnetic material, e.g., $Al_2O_3.TiC$. A medium-facing surface 100a of the slider 100 faces the recording medium M, and when the recording medium M is rotated, the slider 100 flies from surface of the recording medium M by an air stream on the surface.

A protective layer 101 formed from a nonmagnetic insulating material, e.g., $Al_2O_3$ or $SiO_2$, is disposed on the trailing-side end surface 100b of the slider 100, and the playback portion R is disposed on this protective layer 101. The playback portion R includes a lower shield layer 102, an upper shield layer 105, a gap insulating layer 104 for filling between the lower shield layer 102 and the upper shield layer 105, and a playback element 103 positioned in this gap insulating layer 104. The playback element 103 is a magnetoresistance effect element, e.g., AMR, GMR, or TMR.

The recording portion W is laminated on the upper shield layer 105. The recording portion W includes a plurality of lower layer coils 107 disposed on the upper shield layer 105 with a coil insulating layer 106 therebetween, a main magnetic pole layer 110 which is a magnetic layer, a magnetic gap layer 113, a plurality of upper layer coils 115 disposed on the magnetic gap layer 113 with a coil insulating layer 114 therebetween, and a return yoke layer 118 which is a magnetic layer.

The lower layer coils 107 are formed from, for example, at least one nonmagnetic metal material selected from Au, Ag, Pt, Cu, Cr, Al, Ti, NiP, Mo, Pd, Rh, and Ni. Alternatively, the lower layer coils 107 may have a laminated structure in which these nonmagnetic metal materials are laminated. A lower layer coil insulating layer 108 is disposed around the lower layer coils 107.

A heating element 130, which is positioned under the lower layer coils 107 and which generates heat through energization, is embedded in the lower layer coil insulating layer 108. The heating element 130 is composed of a heating element pattern in the shape of an inverted letter Ω extending from both sides of the playback element 103 in a track width direction toward the rear in a height direction or in the meandering shape, and is formed from, for example, NiFe, CuNi, or CuMn by a sputtering method. This heating element 130 has edge portions 131 parallel to the lower layer coils 107 (FIG. 4, FIG. 6) on the medium-facing surface side, and is arranged in such a way that the edge portions 131 are positioned in the spaces between the lower layer coils 107. The heating element 130 is energized through a pair of electrode leads 132 extending toward the rear in the height direction. The playback element 103 is thermally expanded due to energization of the heating element 130 and is protruded toward the recording medium M side. The amount of protrusion of the playback element 103 can be controlled by the heat generation temperature of the heating element 130, that is, by the amount and the time of current passed through the heating element 130. The coil insulating layer 106 is composed of a first insulating layer 106A interposing between the upper shield layer 105 and the heating element 130 and a second insulating layer 106B disposed on this first insulating layer 106A while covering the heating element 130.

The main magnetic pole layer 110 and an auxiliary yoke layer 109 magnetically connected to the main magnetic pole layer 110 are disposed on the lower layer coil insulating layer 108. The auxiliary yoke layer 109 formed from a magnetic material having a saturation magnetic flux density lower than that of the main magnetic pole layer 110 is disposed just below the main magnetic pole layer 110, and magnetically functions as a part of the main magnetic pole layer 110. The top surfaces of the auxiliary yoke layer 109 and the lower layer coil insulating layer 108 are flattened. A plating substrate layer is disposed on this flattened surface, and the main magnetic pole layer 110 is further disposed on the plating substrate layer. The main magnetic pole layer 110 has a predetermined length from the surface F facing the recording medium M (hereafter simply referred to as a facing surface F) in the Y direction shown in the drawing. The dimension in the X direction shown in the drawing of a front end surface 110a exposed at the facing surface F is specified to be the recording track width Tw. This main magnetic pole layer 110 is formed by plating from a ferromagnetic material, e.g., Ni—Fe, Co—Fe, or Ni—Fe—Co, having a high saturation magnetic flux density.

The magnetic gap layer 113 is disposed on the main magnetic pole layer 110 and an insulating material layer 111 filling the surroundings thereof (both sides in the X direction shown in the drawing and the rear in the Y direction shown in the drawing of the main magnetic pole layer 110). A throat height-determining layer 117 formed from an inorganic or organic material is disposed on the magnetic gap layer 113, at a position a predetermined distance from the facing surface F. The throat height of the thin film magnetic head H is specified by the distance from the facing surface F to the front end edge of the throat height-determining layer 117.

Similarly to the lower layer coils 107, the upper layer coils 115 are formed from, for example, at least one nonmagnetic metal material selected from Au, Ag, Pt, Cu, Cr, Al, Ti, NiP, Mo, Pd, Rh, and Ni. Alternatively, the upper layer coils 115 may have a laminated structure in which these nonmagnetic metal materials are laminated. An upper layer coil insulating layer 116 is disposed around the upper layer coils 115.

The respective end portions of the above-described lower layer coil 107 and the upper layer coil 115 in the X direction shown in the drawing are electrically connected to each other so as to become into the shape of a solenoid. The shape of the coil layer is not specifically limited to the shape of a solenoid, but may be a spiral shape in which the coil is wound around a connection portion 118b between the main magnetic pole layer 110 and the return yoke layer 118.

The return yoke layer 118 formed from a ferromagnetic material, e.g., permalloy, is disposed over the upper layer coil insulating layer 116 to the magnetic gap layer 113. This return yoke layer 118 has a front end surface 118a exposed at the facing surface F and is opposed to the main magnetic pole layer 110 with a gap spacing therebetween on the facing surface F. The rear end of the return yoke layer 118 in the height direction is the connection portion 118b connected to the main magnetic pole layer 110. The return yoke layer 118 is covered with a surface protective layer 120.

In the thin film magnetic head having the above-described entire configuration, the pair of electrode leads 132 of the heating element 130 include wide wiring portions 132a having a width larger than the line width w1 of the heating element 130 and connection wiring portions 132b for connecting between the wide wiring portions 132a and the rear end of the heating element 130 in a height direction. The wide wiring portions 132a have a slender linear pattern with a constant line width of w2 extending in the height direction, and are electrically connected to electrode pads (not shown in the drawing) of the head surface at end portions opposite to the side of the end portions connected to the connection wiring portions 132b. The connection wiring portions 132b have a two-dimensionally trapezoidal pattern in which the line width w3 (w1≦w3≦w2) is decreased gradually from the wide wiring portions 132a toward the heating element 130. The line width of one end portion in contact with the rear end of the heating element 130 in the height direction is allowed to agree with the line width w1 of the heating element 130, and the line width of the other end portion in contact with the wide wiring portion 132a is allowed to agree with the line width w2 of the wide wiring portion 132a.

The connection wiring portions 132b are disposed in regions sandwiched between the upper shield layer 105 and the return yoke layer 118 in the lamination direction. In the shield region, since the upper shield layer 105 and the return yoke layer 118 formed from a magnetic material, e.g., NiFe, have thermal conductivities higher than $Al_2O_3$ (the gap insulating layer 104, the coil insulating layer 106, the lower layer coil insulating layer 108, the insulating material layer 111, the surface protective layer 120, and the like) present in the element and the periphery of the element, the heat is easily diffused through the upper shield layer 105 and the return yoke layer 118. Therefore, a local temperature increase can be prevented. In the present embodiment, the upper shield layer 105 and the return yoke layer 118 are formed into the same two-dimensional shape. Consequently, the above-described shield region is equal to the upper shield layer 105-forming region and the return yoke layer 118-forming region.

When the heating element 130 is energized, not only the heating element 130, but also the electrode leads 132 themselves generate heat due to the current passing through the electrode leads 132. In the electrode lead 132, the electric resistance of the connection wiring portion 132*b* is larger than that of the wide wiring portion 132*a* in accordance with the dimensional relationship between the line width w2 and the line width w3. In particular, the amount of the heat generated from the connection wiring portion 132*b* becomes large. However, since the connection wiring portions 132*b* are disposed in the shield region, as described above, the heat generated from the connection wiring portions 132*b* is transferred to the upper shield layer 105 and the return yoke layer 118, and is diffused all over the shield region through both layers 105 and 118. Therefore, a local temperature increase of the connection wiring portions 132*b* alone does not occur. Consequently, an occurrence of migration due to the temperature increase in the connection wiring portions 132*b*, by extension, an occurrence of break due to the migration, can be prevented.

In the present embodiment, as described above, the upper shield layer 105 and the return yoke layer 118 having the same two-dimensional shape are included. However, the two-dimensional shapes of the upper shield layer 105 and the return yoke layer 118 can be set at will. When the upper shield layer and the return yoke layer having different two-dimensional shapes are included, the portion where the upper shield layer-forming portion and the return yoke layer-forming portion are overlapped in a lamination direction becomes the above-described shield region.

The above-described pair of electrode leads 132 may be formed by using the same material as the material for the heating element 130 simultaneously in the step of forming the heating element 130, that is, integrally with the heating element 130. When the heating element 130 and the pair of electrode leads 132 are formed in the same step, the manufacturing process may be simplified. As a matter of course, the pair of electrode leads 132 may be formed from an electrode material different from the material for the heating element 130, for example, from an electrically conductive material having electric resistance lower than that of the heating element 130.

In the above-described embodiment, the present invention is applied to the thin film magnetic head H of the perpendicular recording system. However, the present invention may be applied to a thin film magnetic head of a longitudinal recording system. Likewise, the present invention may also be applied to a thin film magnetic head provided with a spiral-shaped coil layer wound around a connection portion of a magnetic core layer between a pair of magnetic core layers (main magnetic pole layer, return yoke layer), not specifically limited to the thin film magnetic head provided with a solenoid-shaped coil layer.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A thin film magnetic head comprising:
 a playback element disposed between a lower shield layer and an upper shield layer;
 a recording element laminated on the upper shield layer, wherein the recording element comprises a main magnetic pole layer and a return yoke layer such that the return yoke layer is opposite the main magnetic pole layer with a gap spacing therebetween, and wherein the rear end of the return yoke layer in the height direction is connected to the main magnetic pole layer;
 a heating element which is disposed below a coil layer serving as a part of the recording element and which generates heat during energization so as to allow at least one of the playback element and the recording element to protrude toward the recording medium side through thermal expansion; and
 a pair of electrode leads of the heating element,
 wherein the pair of electrode leads include wide wiring portions having a width larger than the line width of the heating element and connection wiring portions for connecting between the wide wiring portions and the rear ends of the heating element in a height direction, the connection wiring portions are disposed in a region sandwiched between the upper shield layer and a magnetic layer of the recording element in a lamination direction, and the entire connection wiring portion, as seen from the lamination direction, is within the upper shield layer and the return yoke layer.

2. The thin film magnetic head according to claim 1, wherein the connection wiring portions are disposed taking a two-dimensionally trapezoidal shape in which the line width is decreased from the wide wiring portion toward the rear end of the heating element in the height direction.

3. The thin film magnetic head according to claim 1, wherein the heating element and the pair of electrode leads are embedded in an insulating layer disposed at a position just below the coil layer.

4. The thin film magnetic head according to claim 1, wherein the pair of electrode leads formed from the same material as that for the heating element are disposed integrally with the heating element.

* * * * *